(12) United States Patent
Rendall

(10) Patent No.: US 10,763,551 B2
(45) Date of Patent: Sep. 1, 2020

(54) METHOD OF FABRICATING AN ENERGY STORAGE DEVICE

(71) Applicant: Dyson Technology Limited, Wiltshire (GB)

(72) Inventor: Michael Edward Rendall, Newbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 129 days.

(21) Appl. No.: 16/085,552

(22) PCT Filed: Mar. 2, 2017

(86) PCT No.: PCT/GB2017/050550
§ 371 (c)(1),
(2) Date: Sep. 14, 2018

(87) PCT Pub. No.: WO2017/158319
PCT Pub. Date: Sep. 21, 2017

(65) Prior Publication Data
US 2019/0115627 A1 Apr. 18, 2019

(30) Foreign Application Priority Data

Mar. 15, 2016 (GB) .................................. 1604351.5

(51) Int. Cl.
*H01M 10/0585* (2010.01)
*H01M 6/40* (2006.01)
(Continued)

(52) U.S. Cl.
CPC ...... *H01M 10/0585* (2013.01); *H01G 9/0032* (2013.01); *H01G 9/0036* (2013.01);
(Continued)

(58) Field of Classification Search
CPC ........ H01G 11/12; H01G 11/68; H01G 11/70; H01G 11/72; H01G 11/76; H01G 11/84;
(Continued)

(56) References Cited

U.S. PATENT DOCUMENTS 3,761,500 A 9/1973 Thomas
3,993,508 A 11/1976 Erlichman
(Continued)

FOREIGN PATENT DOCUMENTS

CN 101562245 10/2009
CN 101694876 4/2010
(Continued)

OTHER PUBLICATIONS

Mehrotra R. C. et al. (Jan. 1978). "Preparation and Characterization of Some Volatile Double Isopropoxides of Aluminium with Alkaline Earth Metals," Inorganica Chemica Acta 29:131-136.
(Continued)

*Primary Examiner* — Basia A Ridley
*Assistant Examiner* — Heng M. Chan
(74) *Attorney, Agent, or Firm* — Morrison & Foerster LLP

(57) ABSTRACT

A method of fabricating an energy storage device (1) comprising forming a stack comprising at least a first electrode layer (6), a first current collecting layer (12) and an electrolyte layer 8 disposed between the first electrode layer (6) and the first current collecting layer (12). Forming a first groove (24) in the stack through the first electrode layer (6) and the electrolyte layer (8), thereby forming exposed edges of the first electrode layer 6 and the electrolyte layer (8). Filling at least part of the first groove (24) with an electrically insulating material thereby covering the exposed edges of the first electrode layer (6) and the electrolyte layer (8) with the insulating material. Cutting through the insulating
(Continued)

material and the first current collecting layer (12) along at least part of the first groove (24) in order to form an exposed edge of the first current collecting layer (12).

12 Claims, 6 Drawing Sheets

(51) Int. Cl.
| | | |
|---|---|---|
| *H01M 10/052* | (2010.01) | |
| *H01M 10/04* | (2006.01) | |
| *H01M 10/0562* | (2010.01) | |
| *H01G 11/70* | (2013.01) | |
| *H01G 11/72* | (2013.01) | |
| *H01G 11/84* | (2013.01) | |
| *H01G 11/12* | (2013.01) | |
| *H01G 11/76* | (2013.01) | |
| *H01G 11/68* | (2013.01) | |
| *H01G 9/00* | (2006.01) | |
| *H01G 9/025* | (2006.01) | |
| *H01G 9/048* | (2006.01) | |
| *H01G 9/07* | (2006.01) | |
| *H01M 10/0525* | (2010.01) | |

(52) U.S. Cl.
CPC .............. *H01G 9/025* (2013.01); *H01G 9/048* (2013.01); *H01G 9/07* (2013.01); *H01G 11/12* (2013.01); *H01G 11/68* (2013.01); *H01G 11/70* (2013.01); *H01G 11/72* (2013.01); *H01G 11/76* (2013.01); *H01G 11/84* (2013.01); *H01M 6/40* (2013.01); *H01M 10/0436* (2013.01); *H01M 10/052* (2013.01); *H01M 10/0525* (2013.01); *H01M 10/0562* (2013.01)

(58) Field of Classification Search
CPC .... H01G 9/0032; H01G 9/0036; H01G 9/025; H01G 9/048; H01G 9/07; H01M 10/0436; H01M 10/052; H01M 10/0525; H01M 10/0562; H01M 10/0585; H01M 6/40
See application file for complete search history.

(56) References Cited

U.S. PATENT DOCUMENTS

| | | | |
|---|---|---|---|
| 4,047,289 | A | 9/1977 | Wolff |
| 4,288,381 | A | 9/1981 | Dozzi et al. |
| 5,136,046 | A | 8/1992 | Park et al. |
| 5,250,784 | A | 10/1993 | Muller et al. |
| 5,411,592 | A | 5/1995 | Ovshinsky et al. |
| 5,718,989 | A | 2/1998 | Aoki et al. |
| 6,616,714 | B1 | 9/2003 | Gauthier et al. |
| 9,755,272 | B2 | 9/2017 | Gaben |
| 9,768,450 | B2 | 9/2017 | Song et al. |
| 9,893,376 | B2 | 2/2018 | Yang et al. |
| 2002/0110733 | A1 | 8/2002 | Johnson |
| 2003/0162086 | A1 | 8/2003 | Longhi et al. |
| 2005/0014065 | A1 | 1/2005 | Jung et al. |
| 2007/0238019 | A1 | 10/2007 | Laurent et al. |
| 2008/0263855 | A1 | 10/2008 | Li et al. |
| 2008/0264478 | A1 | 10/2008 | Ahn et al. |
| 2009/0148764 | A1* | 6/2009 | Kwak .............. H01M 10/0436 429/162 |
| 2010/0108939 | A1 | 5/2010 | Breger et al. |
| 2011/0126402 | A1 | 6/2011 | Kwak et al. |
| 2011/0129594 | A1 | 6/2011 | Kwak et al. |
| 2011/0294015 | A1 | 12/2011 | Pirk et al. |
| 2011/0311883 | A1 | 12/2011 | Oukassi et al. |
| 2012/0225199 | A1 | 9/2012 | Muthu et al. |
| 2012/0270114 | A1 | 10/2012 | Reynolds et al. |
| 2012/0312474 | A1 | 12/2012 | Kwak et al. |
| 2012/0321815 | A1 | 12/2012 | Song et al. |
| 2013/0160283 | A1 | 6/2013 | Wu |
| 2013/0298387 | A1 | 11/2013 | Kobier et al. |
| 2014/0007418 | A1 | 1/2014 | Song et al. |
| 2014/0120397 | A1 | 5/2014 | Kim et al. |
| 2014/0227609 | A1 | 8/2014 | Frey et al. |
| 2014/0255603 | A1 | 9/2014 | Xiao et al. |
| 2015/0010822 | A1 | 1/2015 | Nakahara et al. |
| 2015/0050522 | A1 | 2/2015 | Manthiram et al. |
| 2015/0102530 | A1* | 4/2015 | Wallace .............. H01M 10/052 264/400 |
| 2015/0188186 | A1 | 7/2015 | Bedjaoui et al. |
| 2015/0280201 | A1 | 10/2015 | Bhardwaj |
| 2016/0372783 | A1 | 12/2016 | Min et al. |

FOREIGN PATENT DOCUMENTS

| | | | |
|---|---|---|---|
| CN | 102054986 | | 5/2011 |
| CN | 102881873 | | 1/2013 |
| CN | 103035900 | | 4/2013 |
| CN | 103311513 | | 9/2013 |
| CN | 103545519 | | 1/2014 |
| CN | 105742607 | | 7/2016 |
| CN | 105810934 | | 7/2016 |
| CN | 106410186 | | 2/2017 |
| DE | 42 27 720 | | 4/1993 |
| EP | 1189296 | | 3/2002 |
| EP | 2746288 | | 6/2014 |
| GB | 1 402 544 | | 8/1975 |
| GB | 2 128 604 | | 5/1984 |
| JP | 57-96472 | | 6/1982 |
| JP | S64-21870 | | 1/1989 |
| JP | H4-269721 | | 9/1992 |
| JP | 2000-149911 | | 5/2000 |
| JP | 2002-343342 | | 11/2002 |
| JP | 2003-226955 | | 8/2003 |
| JP | 2009-182273 | | 8/2009 |
| JP | 2009-246236 | | 10/2009 |
| JP | 2009-544141 | | 12/2009 |
| JP | 2010-251075 | | 11/2010 |
| JP | 2011-108603 | | 6/2011 |
| KR | 10-2016-0091172 | | 8/2016 |
| KR | 10-2017-0008540 | | 1/2017 |
| KR | 10-2017-0025874 | | 3/2017 |
| WO | 2009/055529 | | 4/2009 |
| WO | WO-2009055529 | A1 * | 4/2009 .............. H01M 6/40 |
| WO | 2010/036723 | | 4/2010 |
| WO | 2011/052607 | | 5/2011 |
| WO | 2012/065767 | | 5/2012 |
| WO | 2013/035519 | | 3/2013 |
| WO | 2015/107194 | | 7/2015 |
| WO | 2016/001884 | | 1/2016 |
| WO | 2016/210419 | | 12/2016 |
| WO | 2017/087403 | | 5/2017 |

OTHER PUBLICATIONS

Yasushi, J. et al. (Nov. 16, 1984) "CAS No. [32843-22-4] Aluminate(1-), tetrakis(diphenylaminato)-, magnesium," (2 pages).
Cucinella, S., et al. (1982). "Calcium Alkoxyalanates I. Synthesis and Physicochemical Characterization," Journal of Organometallic Chemistry 224(1): 1-12.
Hudson, M. Sterlin Leo, et al. (2007). "Studies on Synthesis and Dehydrogenation Behavior of Magnesium Alanate and Magnesium-Sodium Alanate Mixture," International Journal of Hydrogen Energy 32(18): 4933-4938.
Lu, Z., et al. (Apr. 2002). "Synthesis, Structure, and Electrochemical Behavior of Li[$Ni_xLi_{(1/3-2x/3)}Mn_{(2/3-x/3)}$]$O_2$," Journal of the Electrochemical Society, 149(6): A778-A791.
Metz, Matthew V., et al. (2002). "Weakly Coordinating Al-, Nb-, Ta-, Y-, and La-Based Perfluoroaryloxymetalate Anions as Cocatalyst Components for Single-Site Olefin Polymerization," Organometallics 21(18): 3691-3702.
Notice of Reasons for Rejection dated Aug. 26, 2019, directed to JP Application No. 2018-546903; 10 pages.

(56) References Cited

OTHER PUBLICATIONS

Park, K., et al. (May 2010). "Suppression of O2 evolution from oxide cathode for lithium-ion batteries: VOx-impregnated 0.5Li2MnO3-0.5LiNi0.4Co0.2Mn0.4O2 cathode," Chemical Communications, 46(23): 4190-4192.

Park, Y. J., et al (Apr. 2004). "Structural investigation and electrochemical behaviour of Li[NixLi(1/3-2x/3)Mn(2/3-x/3)] O2 compounds by a simple combustion method," Journal of Power Sources 129: 288-295.

Thackeray, M.M., et al. (Aug. 2006). "Comments on the structural complexity of lithium-rich Li1+xM1-xO2 electrodes (M=Mn, Ni, Co) for lithium batteries," Electrochemistry Communications 8(9):1531-1538.

Turova, N. Ya., et al. (1977). "Hydrolysis and Alcoholysis of Alkali Metal Aluminium Hydrides," Inorganica Chimica Acta, 21: 157-161.

Wu, Y., et al. (Mar. 2006). "High Capacity, Surface-Modified Layered Li[Li(1-x)/3Mn(2-x)/3Nix/3Cox/3]O2 Cathodes with Low Irreversible Capacity Loss," Electrochemical and Solid-State Letters 9(5): A221-A224.

Birrozzi, A., et al. (2016). "Beneficial effect of propane sultone and tris(trimethylsilyl) borate as electrolyte additives on the cycling stability of the lithium rich nickel manganese cobalt (NMC) oxide," 325:525-533.

International Search Report and Written Opinion dated May 12, 2017, directed to International Application No. PCT/GB2017/050550; 11 pages.

Search Report dated Oct. 6, 2016, directed to GB Application No. 1604351.5; 1 page.

\* cited by examiner

METHOD OF FABRICATING AN ENERGY STORAGE DEVICE

REFERENCE TO RELATED APPLICATIONS

This application is a national stage application under 35 USC 371 of International Application No. PCT/GB2017/050550, filed Mar. 2, 2017, which claims the priority of United Kingdom Application No. 1604351.5, filed Mar. 15, 2016, the entire contents of each of which are incorporated herein by reference.

FIELD OF THE INVENTION

This invention relates to a method of fabricating an energy storage device, and particularly, to an energy storage device comprising thin film cells having a solid electrolyte.

BACKGROUND OF THE INVENTION

Solid-state thin film cells comprising layers of electrodes, electrolyte and current collectors are typically produced by first forming a stack comprising a first current collecting layer formed on a substrate, an electrode layer, an electrolyte layer, a second electrode layer and a second current collecting layer. The stack is then cut into separate sections to form individual cells. Each cell can then be coated with a protective layer in order to prevent passivation of the layers and possible shorts.

In order to form an electrical connection with the cell, for example in order to electrically connect current collectors of multiple cells stacked one on top of another, part of the protective layer is removed, for example by etching. Alternatively, a mask can be applied prior to the coating process to ensure that a portion of each current collector is left exposed. In each instance, the additional step of masking or etching adds complexity and cost the production process.

SUMMARY OF THE INVENTION

According to some embodiments, provided is a method of fabricating an energy storage device comprising: forming a stack comprising at least a first electrode layer, a first current collecting layer and an electrolyte layer disposed between the first electrode layer and the first current collecting layer; forming a first groove in the stack through the first electrode layer and the electrolyte layer, thereby forming exposed edges of the first electrode layer and the electrolyte layer; filling at least part of the first groove with an electrically insulating material thereby covering the exposed edges of the first electrode layer and the electrolyte layer with the insulating material; and cutting through the insulating material and the first current collecting layer along at least part of the first groove in order to form an exposed edge of the first current collecting layer.

In some embodiments, provided is a simple, fast and low cast way of producing a solid-state cell having exposed current collectors which can then be readily connected electrically to other cells forming part of a cell stack.

The stack further may further comprise a second current collecting layer associated with the first electrode layer, wherein the first electrode layer and the electrolyte layer are disposed between the first and second current collecting layers. The first groove may be formed in the stack through the second current collecting layer, thereby forming an exposed edge of the second current collecting layer.

The electrically insulating material may cover the exposed edge of the second current collecting layer.

Methods may further comprise forming a second groove in the stack through the first current collecting layer, the electrolyte layer and the first electrode layer, thereby forming exposed edges of the first current collecting layer, the electrolyte layer and the first electrode layer, filling at least part of the second groove with an electrically insulating material thereby covering the exposed edges of the first current collecting layer, the electrolyte layer and the first electrode layer, and cutting through the insulating material and the second current collecting layer along at least part of the second groove in order to form an exposed edge of the second current collecting layer.

The first current collecting layer may form a second electrode layer. Alternatively or in addition, the stack may further comprise a second electrode layer disposed between the first current collecting layer and the electrolyte layer and the first groove is further formed through the second electrode layer.

The first and/or second groove may be formed by a laser cutting operation. A gaseous monomer may be provided in the region of the first and/or second grooves during the laser cutting operation such that the gaseous polymer is polymerised by the laser cutting operation within the grooves to form the electrically insulating material. The step of filling at least part of the first groove with an electrically insulating material may comprise the step of filling at least part of the groove with a liquid. The liquid may comprise an organic suspended liquid material. The liquid may be cured in the groove. The energy storage device may be an electrochemical cell or a capacitor.

BRIEF DESCRIPTION OF THE DRAWINGS

In order to better understand the present invention, and to show more clearly how the invention may be put into effect, the invention will now be described, by way of example, with reference to the following drawings.

DETAILED DESCRIPTION OF THE INVENTION

Figure 1:
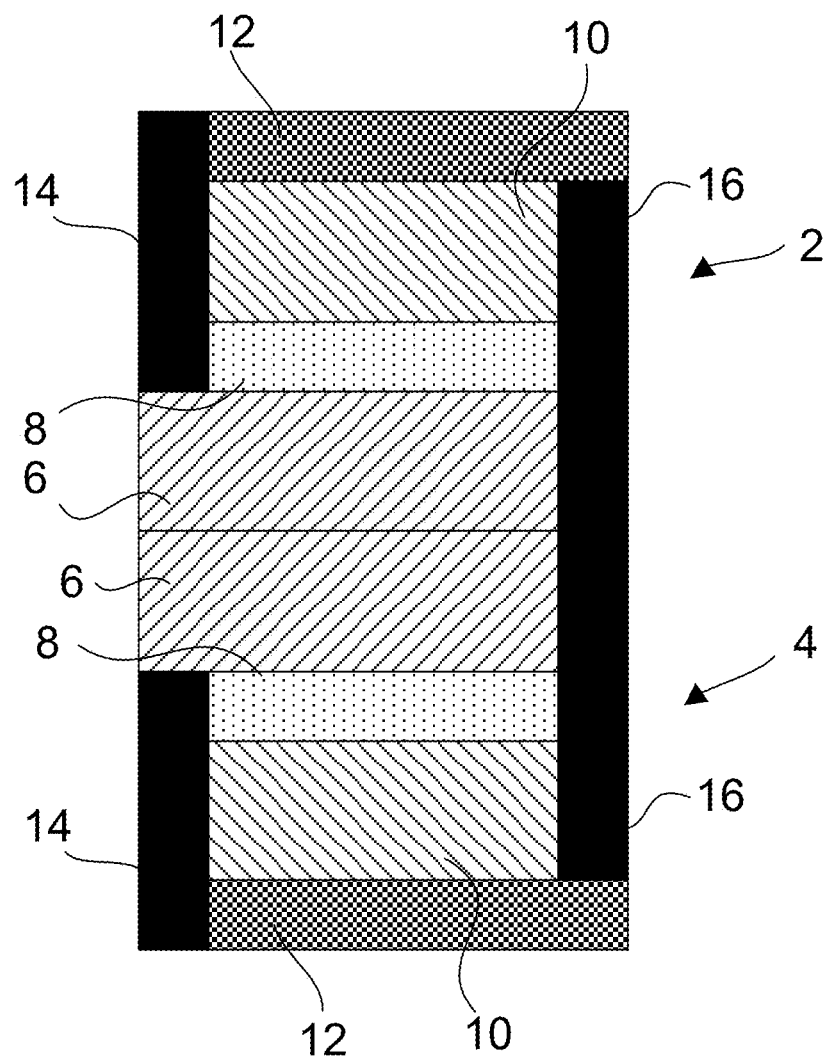
FIG. 1 is a schematic representation of an energy storage device comprising a plurality of cells, according to some embodiments.

FIG. 1 shows an energy storage device 1 comprising a first electrochemical cell 2 positioned on top of a second electrochemical cell 4. The first and second cells 2, 4 are identical. The first cell 2, however, is inverted. Each cell 2, 4 comprises a stack having a negative current collecting layer 6 which also forms a negative electrode layer (which becomes the anode during discharge of the cell 2, 4), an electrolyte layer 8, a positive electrode layer 10 (which becomes the cathode on discharge of the cell 2, 4), and a positive current collecting layer 12. Each cell 2, 4 is bounded along opposite sides by an insulating material 14, 16.

On the left hand side of each cell 2, 4 (as shown in FIG. 1), the insulating material 14 covers the edges of the electrolyte layer 8, the positive electrode layer 10 and the positive current collecting layer 12. The edge of the negative current collecting layer/negative electrode layer 6 on the left hand side of each cell 2, 4 is exposed.

On the right hand side of each cell (as shown in FIG. 1), the insulating material 16 covers edges of negative current collecting layer/negative electrode layer 6, the electrolyte layer 8 and the positive electrode layer 10. The edge of the positive current collecting layer 12 on the right hand side of each cell 2, 4 is exposed.

Figure 2:
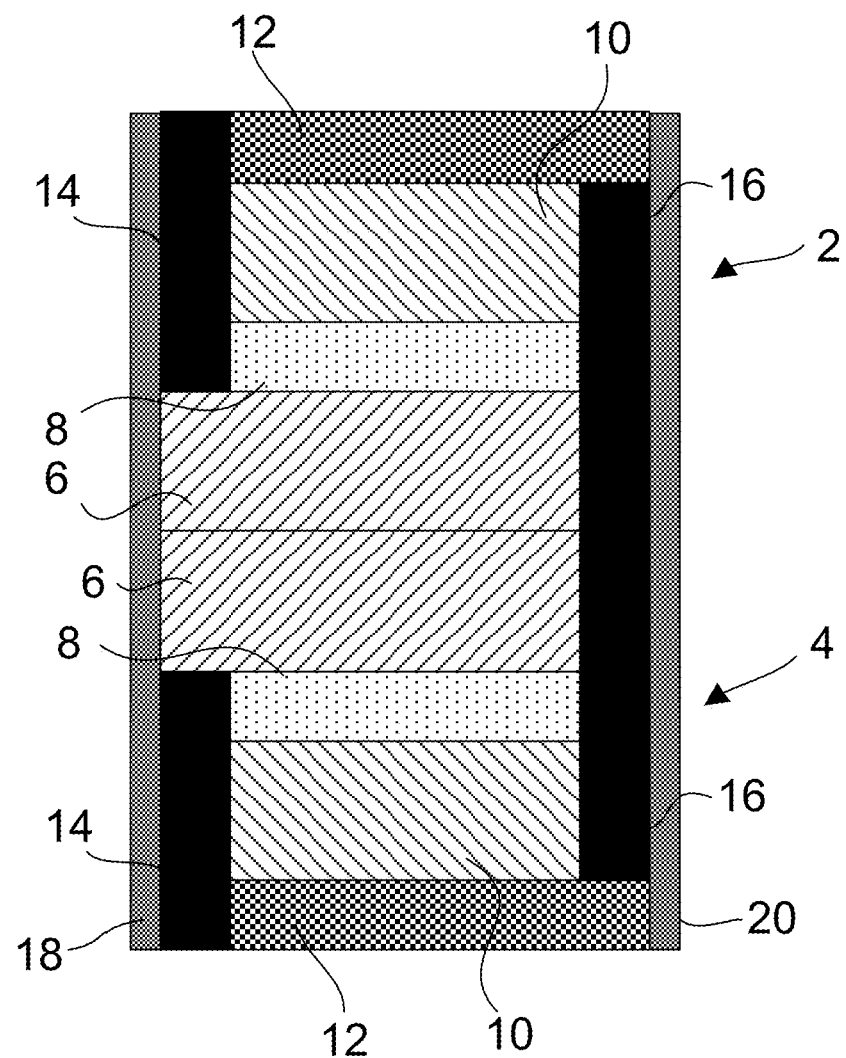
FIG. 2 is a schematic illustration of the energy storage device shown in FIG. 1 in which the cells are electrically connected, according to some embodiments.

A benefit of the energy storage device 1 is that electrical connectors 18, 20 can be provide along opposite sides of the two cells 2, 4, as shown in FIG. 2, such that the electrical connector 18 on the left contacts the negative current collecting layer 6 of each cell 2, 4, but is prevented from contacting the other layers by the insulating material 14, and the electrical connector 20 on the right contacts the positive current collecting layer 12, but is prevented from contacting the other layers by the insulating material 16. The insulating material 14, 16 therefore prevents a short between the current collecting layers 6, 12 and the other layers in each cell 2, 4. The electrical connectors 18, 20 may, for example, be a metallic material that is applied to the edges of the stack by sputtering. The cells 2, 4 can therefore be joined in parallel simply and easily.

A method of manufacturing the cells shown in FIGS. 1 and 2 will now be described with reference to FIGS. 3a to 3h.

Figure 3A:
FIGS. 3a to 3h illustrate a method of manufacturing the cells of the energy storage device shown in FIG. 1, according to some embodiments.
Figure 3B:
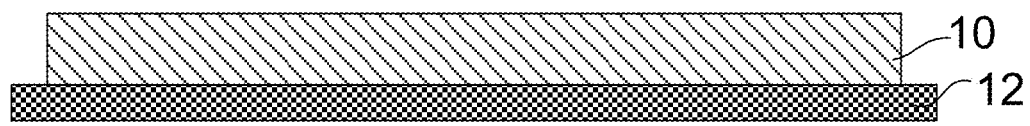
Figure 3C:
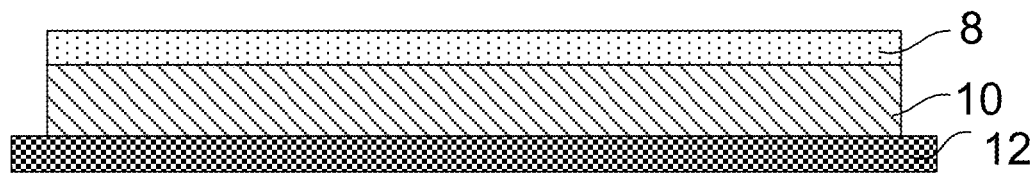
Figure 3D:
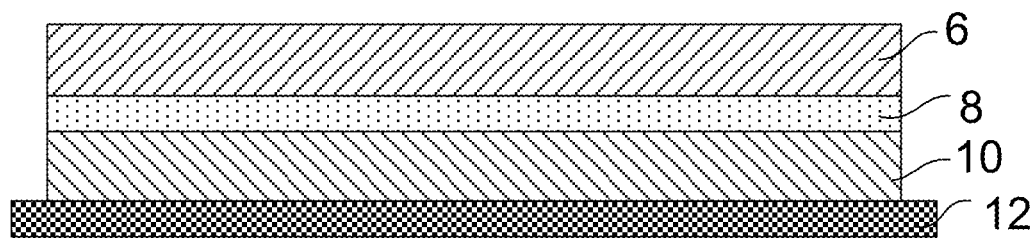

FIG. 3a shows a positive current collecting layer 12 comprising nickel foil, but it will be appreciated that any suitable metal could be used such as aluminium, copper or steel, or a metalised material including metalised plastics such as aluminium on polyethylene terephthalate (PET). A first positive electrode layer 10 is deposited on the current collecting layer 12 for example by flood deposition or by vapour deposition, as shown in FIG. 3b. The positive electrode layer 10 forms the cathode during discharge and may comprise a material which is suitable for storing Lithium ions by virtue of stable chemical reactions, such as Lithium Cobalt Oxide or Lithium Iron Phosphate or alkali metal polysulphide salts. An electrolyte layer 8 is deposited on top of the positive electrode layer 10, as shown in FIG. 3c. For an electrochemical cell the electrolyte layer may comprise any suitable material which is ionically conductive, but which is also an electrical insulator such as Lithium Phosporous OxyNitride (LiPON). A negative electrode layer 6 is deposited on top of the electrolyte layer 8, as shown in FIG. 3d which completes assembly of a stack. The negative electrode layer 6 also provides a negative current collector (which acts as an anode during discharge). In some embodiments, the negative current collector and the negative electrode layer may be separate layers. The negative electrode layer may comprise a Lithium metal, Graphite, Silicon or Indium Tin Oxides. In embodiments in which the negative current collector is a separate layer, the negative current collector may comprise nickel foil, but it will be appreciated that any suitable metal could be used such as aluminium, copper or steel, or a metalised material including metalised plastics such as aluminium on polyethylene terephthalate (PET). Each layer may be deposited by flood deposition, which provides a simple and effective way of producing a highly homogenous layer.

Figure 3E:
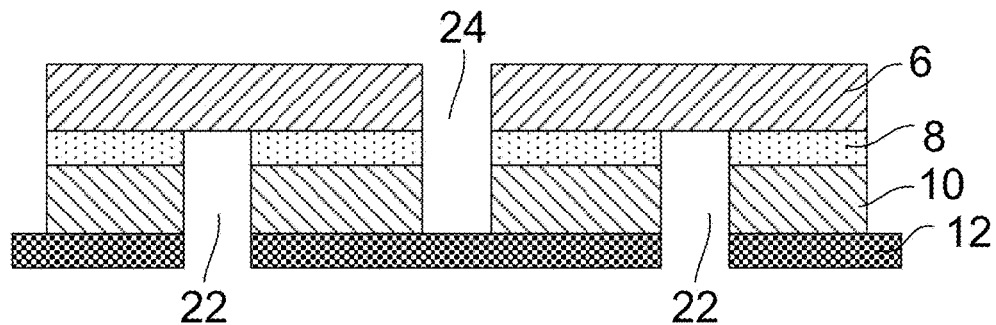

A laser cutting tool is used to cut parallel alternate grooves 22, 24 in the upper and lower portions of the stack, as shown in FIG. 3e. The grooves 22 in the lower portion of the stack are offset from the grooves 24 in the upper portion of the stack. The region of the stack between a lower groove 22 and an adjacent upper groove 24 corresponds to a single cell.

Each groove 22 in the lower portion of the stack is cut through the current collecting layer 12, the positive electrode layer 10 and the electrolyte layer 8 to the negative electrode layer 6.

Each groove 24 in the upper portion of the stack is cut through the negative electrode layer 6, electrolyte layer 8 and positive electrode layer 10 to the current collecting layer 12.

The cutting operation creates edges along each layer which are exposed within the respective grooves and exposes part of an upper surface of the current collecting layer 12 in the upper grooves 24 and part of the lower surface of the negative electrode layer 6 in the lower grooves 22. It will be appreciated that the depth of each groove must be extremely precise in order to cut through only the desired layers and to prevent, or at least minimise, any removal of the layer that is to remain intact. A dual-photon laser cutting technique is the preferred cutting process because it is expected to provide the required accuracy. However, other suitable cutting processes may be used for each step, for example any process that is suitable for removing material to form a groove and/or to separate cells. Different cutting techniques for each step of forming the groove and for separating the cells may be used, for example ultrasound cutting may be followed by gas jetting.

Figure 3F:
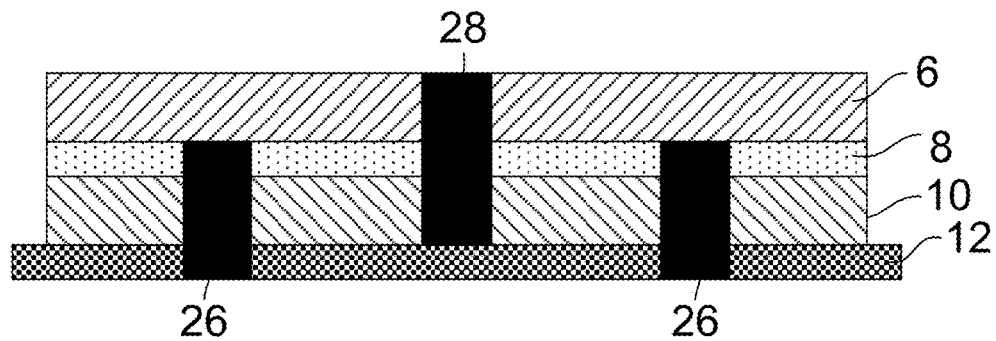

In the embodiment shown, the cutting operation is conducted in an environment comprising a gaseous monomer which, during the cutting operation, polymerises on the edges of the layers formed by the cutting process and on the revealed upper surface of the current collecting layer 12 and the revealed lower surface of the negative electrode layer 6 at the bottom of each groove. The polymer provides an electrically insulating plug 26, 28 that covers the revealed edges and exposed portions of the surfaces of the layers within the groove, as shown in FIG. 3f Any suitable polymer may be used, such as ethylene, vinyl chloride or tetra fluoroethylene. In some embodiments, electrically insulating plugs could be formed by filling the grooves with a liquid such as an organic suspended liquid material and then curing the liquid in the groove.

Figure 3G:
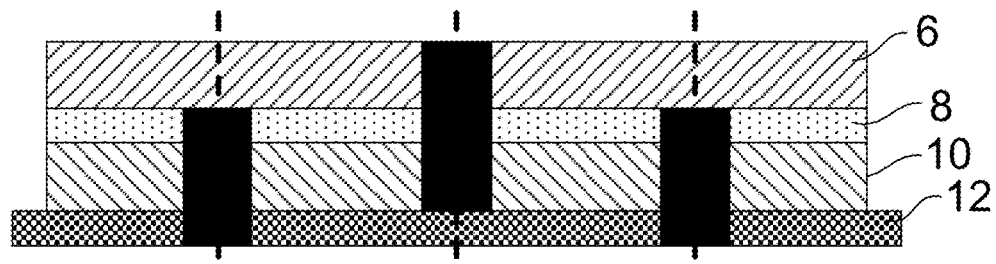
Figure 3H:
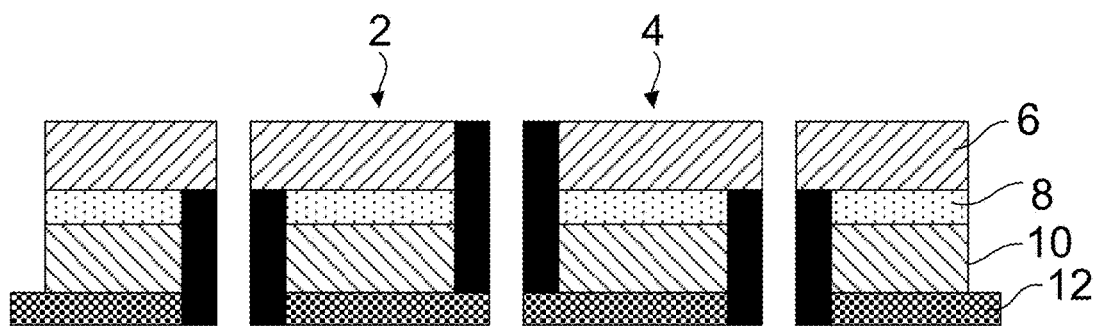

Once the polymer has set, the stack is cut along the grooves 22, 24, as shown by dashed lines in FIG. 3g, into separate cells as shown in FIG. 3h. The cutting operation may again be performed using a laser. Each cut is through the centre of an insulating plug 26, 28 such that the plug 26, 28 is split in two pieces, each piece forming a protective covering over the edges and surfaces to which it has attached of each respective cell 2, 4.

Cutting through the entire stack creates exposed edges of the positive current collecting layer 12 and the negative electrode layer 6 of the first and second cells 2, 4, as shown in FIG. 3h.

The second cell 4 is inverted and placed on top of the first cell 2 to produce the energy storage device 1 shown in FIG. 1. An electrical connector 18, 20, for example a metallic layer, is then formed by sputtering along each side of the energy storage device 1 in order to connect the positive current collecting layers 12 of each cell 2, 4 on one side of the energy storage device 1 and the negative electrode layer/negative current collecting layers 6 on the opposite side of the energy storage device 1, as described previously and as shown in FIG. 2.

Figure 4:
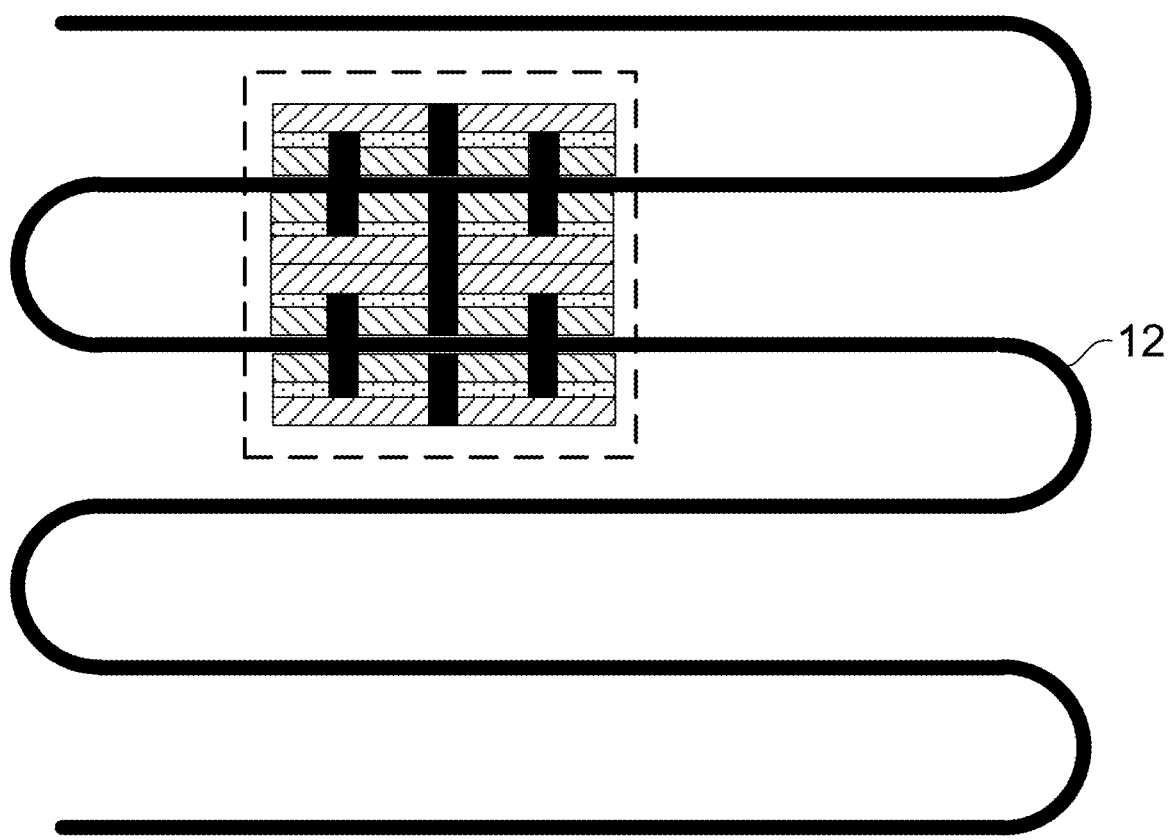
FIG. 4 is a schematic illustration of a variation of the method illustrated in FIGS. 3a to 3h, according to some embodiments.
Figure 5:
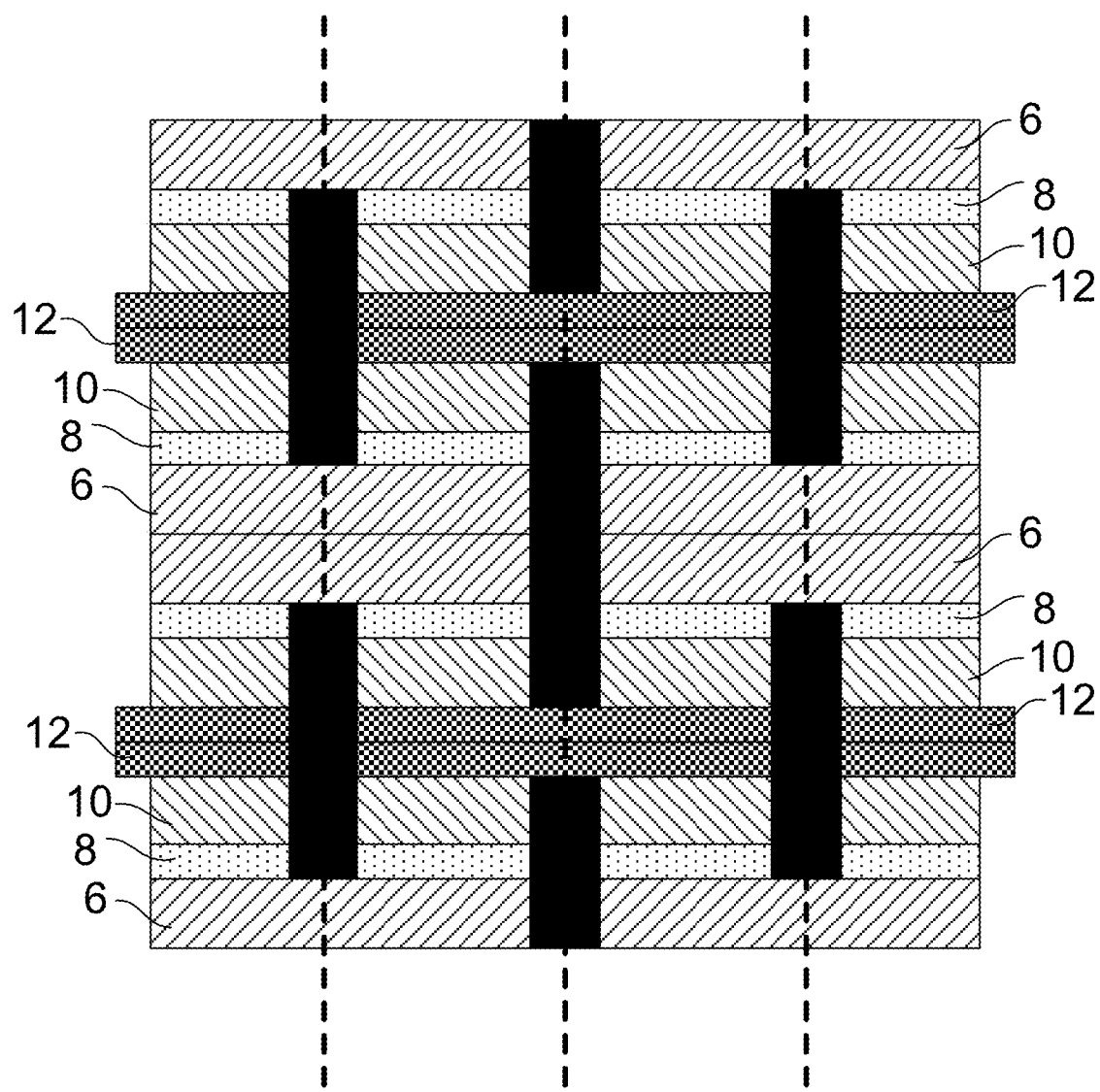
FIG. 5 shows the portion of FIG. 4 within the area surrounded by a broken line, according to some embodiments.

FIGS. 4 and 5 illustrate a variation of the method described above in which a continuous stack is built on a sheet of positive current collecting layer 12 that may, be for example, be drawn from a roll, from which hundreds and potentially thousands of cells can be cut. Once formed, the stack is folded back on itself, as shown in FIG. 4, to create a z-fold arrangement having at least ten, preferably hundreds, and potentially thousands, of layers with each of the insulating plugs 26, 28 aligned, as shown in FIG. 5. A laser cutting process is then used to cut through all of the stacks (shown by the broken lines in FIG. 5) in a single cutting operation for each of the aligned sets of plugs.

The stack may be formed such that it is in a charged state prior to the cutting of the grooves in the stack and prior to cutting the stack into separate cells. The cutting of the grooves, which separate the energy storage components of the cells from each other and/or the subsequent cutting of the current collecting layers to separate the stack into individual cells can improve safety of the manufacturing and subsequent handling processes because a large stack storing a high amount of energy does not need to be handled.

The invention claimed is:

1. A method of fabricating an energy storage device comprising:
   forming a stack comprising first electrode layer, a first current collecting layer, and an electrolyte layer disposed between the first electrode layer and the first current collecting layer;
   forming a first groove in the stack through the first electrode layer and the electrolyte layer to form exposed edges of the first electrode layer and the electrolyte layer;
   filling at least part of the first groove with an electrically insulating material to cover the exposed edges of the first electrode layer and the electrolyte layer with the electrically insulating material; and
   cutting through the electrically insulating material and the first current collecting layer along at least part of the first groove in order to form an exposed edge of the first current collecting layer.

2. The method of claim 1, wherein the stack comprises a second current collecting layer associated with the first electrode layer, wherein the first electrode layer and the electrolyte layer are disposed between the first current collecting layer and the second current collecting layer, and wherein the first groove is formed in the stack through the second current collecting layer, thereby forming an exposed edge of the second current collecting layer.

3. The method of claim 2, wherein the electrically insulating material covers the exposed edge of the second current collecting layer.

4. The method of claim 2, the method further comprising:
   forming a second groove in the stack through the first current collecting layer, the electrolyte layer, and the first electrode layer, to form exposed edges of the first current collecting layer, the electrolyte layer, and the first electrode layer;
   filling at least part of the second groove with an electrically insulating material to cover the exposed edges of the first current collecting layer, the electrolyte layer and the first electrode layer; and
   cutting through the insulating material and the second current collecting layer along at least part of the second groove to form an exposed edge of the second current collecting layer.

5. The method of claim 1, wherein the first current collecting layer forms a second electrode layer.

6. The method of claim 1, wherein the stack comprises a second electrode layer disposed between the first current collecting layer and the electrolyte layer and the first groove is formed through the second electrode layer.

7. The method of claim 1, wherein the first groove is formed by a laser cutting operation.

8. The method of claim 7, wherein a gaseous monomer is provided in a region of the first groove during the laser cutting operation such that a polymer is polymerised by the laser cutting operation within the first groove to form the electrically insulating material.

9. The method of claim 1, wherein filling at least part of the first groove with an electrically insulating material comprises filling at least part of the groove with a liquid.

10. The method of claim 9, wherein the liquid comprises an organic suspended liquid material.

11. The method of claim 9, wherein the liquid is cured in the groove.

12. The method of claim 1, wherein the energy storage device is an electrochemical cell.

* * * * *